United States Patent

[11] 3,613,011

[72] Inventor Paul W. Wood
Warren, Mich.
[21] Appl. No. 789,823
[22] Filed Jan. 8, 1969
[45] Patented Oct. 12, 1971
[73] Assignee General Motors Corporation
Detroit, Mich.

[54] VARACTOR TONE CONTROL APPARATUS
1 Claim, 3 Drawing Figs.

[52] U.S. Cl. ........ 325/424, 179/1 D, 330/109, 330/110
[51] Int. Cl. ........ H04b 1/16
[50] Field of Search ........ 325/411, 413, 414, 422, 423, 424–427, 401, 408, 409; 179/1 F, 1.2; 333/18 T; 330/86, 109, 110, 7, 21, 28, 29, 31, 67, 78, 96, 111; 307/285, 320; 331/36

[56] References Cited

UNITED STATES PATENTS

| | | | |
|---|---|---|---|
| 2,148,030 | 2/1939 | McLennan | 333/18 T |
| 2,262,846 | 11/1941 | Herold | 179/1.2 |
| 2,361,602 | 10/1944 | Clark | 325/424 |
| 3,168,707 | 2/1965 | Levitt et al. | 330/110 |
| 3,384,829 | 5/1968 | Sato | 330/7 |
| 3,461,395 | 8/1969 | Racy | 330/31 |

*Primary Examiner*—Robert L. Griffin
*Assistant Examiner*—Albert J. Mayer
*Attorneys*—George E. Frost and Creighton R. Meland

ABSTRACT: A remotely located potentiometer is manually adjustable so as to vary the capacitance of a varactor which defines a degenerative feedback for regulating the frequency response of an audio amplifier in a radio receiver thereby to exercise tone control over the audio output of the radio receiver. Preferably, the varactor has a metal-insulator-semiconductor structure including an insulating layer of tantalum oxide and a semiconductor layer of N-type silicon sandwiched between a pair of metal electrodes.

INVENTOR.
Paul W. Wood
BY
C. R. Meland
ATTORNEY

VARACTOR TONE CONTROL APPARATUS

This invention relates to frequency compensating apparatus, and more particularly to tone control apparatus for a radio receiver.

Most conventional radio receivers include tone control apparatus so that the listener may selectively attenuate the amplitude of higher audio frequencies so as to compensate for the increased sensitivity of the human ear to the higher audiofrequencies. Often, it is desirable to locate the tone control, as well as other radio control apparatus such as the tuning control and the volume control, remote from the rest of the radio receiver. Thus, in an automotive vehicle, valuable space can be saved behind the instrument panel by placing the radio receiver in some other area of the automotive vehicle and variously connecting it with the radio controls remotely located on the instrument panel.

Present tone control apparatus usually comprises a variable RC filter which selectively attenuates the higher frequency audio signals passing through the filter. Ordinarily, the RC filter is mechanically variable through the manual manipulation of a control element. Therefore, to remotely locate the tone control, it is necessary to couple the RC filter to the rest of the radio receiver through a shielded cable capable of carrying the audiofrequency signals free from interference. Such a shielded cable is a distinct disadvantage from both cost and space standpoints. The present invention proposes a tone control apparatus which alleviates these problems.

According to one aspect of the invention, the relative amplification of higher audiofrequency signals in a radio receiver is selectively reduced thereby to control the tone of the audio output of the radio receiver. In general, this is accomplished by variably regulating the capacitance of a voltage variable capacitor which provides a frequency sensitive impedance for determining the degenerative feedback of an audio amplifier in the radio receiver thereby to control the high-frequency response of the audio amplifier.

In another aspect of the invention, the capacitance of the voltage variable capacitor is regulated from a position located remote from the radio receiver. Generally, this is accomplished by manually adjusting a remotely located variable potentiometer so as to selectively define a control voltage which is coupled to the voltage variable capacitor by a single conductor which need not be shielded.

The invention may be best understood by reference to the following detailed description of a preferred embodiment when considered in conjunction with the accompanying drawing, in which.

Figure 1:
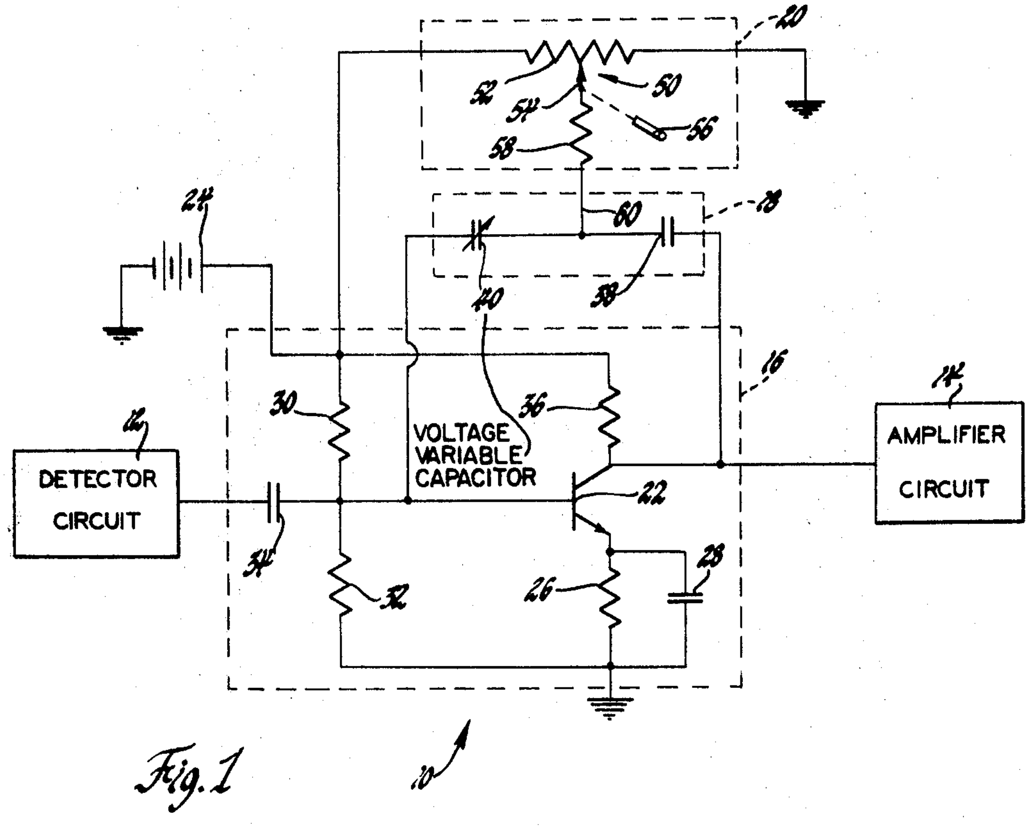
FIG. 1 is a schematic diagram of a preferred embodiment of the invention.

FIG. 1 discloses a portion of a conventional superheterodyne radio receiver. In the illustrated portion, the radio receiver comprises a tone control apparatus 10 connected between a detector circuit 12 and an output amplifier circuit 14. The tone control apparatus 10, which represents a preferred embodiment of the invention, effectively attenuates the amplitude of the higher audiofrequency signals transferred from the detector circuit 12 to the output amplifier circuit 14 thereby to exercise tone control over the audio output of the radio receiver. The illustrated tone control apparatus 10 comprises a conventional amplifier circuit 16 for amplifying audiofrequency signals, a feedback circuit 18 for establishing the frequency response of the amplifier circuit 16, and a control circuit 20 for varying the frequency response established by the feedback circuit 18. The desired relative attenuation of the higher audio frequencies with respect to the lower audiofrequencies is accomplished by variably suppressing the frequency response or gain versus frequency characteristic of the amplifier circuit 16 at frequencies in the upper region of the audiofrequency band.

The amplifier circuit 16 includes an amplifier device such as transistor 22 having base, emitter and collector electrodes. A DC voltage source 24, which may be a battery, supplies power to the amplifier circuit 16. The emitter of the transistor 22 is connected to ground through the parallel combination of a biasing resistor 26 and a bypass capacitor 28. The base or input of the transistor 22 is connected to the positive side of the voltage source 24 through a biasing resistor 30, to ground through a biasing resistor 32, and to the output of the detector circuit 12 through a coupling capacitor 34. The collector or output of the transistor 22 is connected to the positive side of the voltage source 24 through an output resistor 36, and to the input of the output amplifier circuit 14.

In operation, the resistors 26, 30 and 32 provide a biasing arrangement which determines the DC bias voltage across the base and emitter of the transistor 22 so as to establish the operating point of the transistor 22. The capacitor 34 couples audiofrequency signals from the detector circuit 12 to the base of the transistor 22. These audiofrequency signals received as input signals at the base or input of the transistor 22 are amplified and phase shifted and appear as output signals at the collector or output of the transistor 22. From the collector of the transistor 22, the amplified output signals are transmitted to the output amplifier circuit 14. The capacitor 28 shunts the output signals around the resistor 26.

It is to be understood that the amplifier circuit 16 is shown for demonstration purposes only, and that many other audiofrequency amplifier circuits could also be employed. Thus, the audio amplifier circuit 16 need not be limited to a single stage, but may have multiple stages. Similarly, the transistor 22 could be replaced by a vacuum tube or some other suitable amplifier device. Further, although the transistor 22 is illustrated as being of the NPN type, it could also be of the PNP type.

The feedback circuit 18 includes a reactive impedance network comprising a fixed capacitor 38 and a variable capacitor 40 connected in series between the output and input of the amplifier circuit 16, or more specifically, between the collector and base of the transistor 22. The capacitance of the fixed capacitor 38 is made very large compared to the capacitance of the variable capacitor 40 so that the fixed capacitor 38 merely acts as a coupling capacitor and the major portion of the reactive impedance of the feedback circuit 18 is supplied by the variable capacitor 40. Accordingly, the impedance of the variable capacitor 40 determines the amplitude of the negative feedback signals fed from the output back to the input of the amplifier circuit 16.

The negative feedback signals subtract from the input signals at the input of the amplifier circuit 16 thereby to reduce the overall gain of the amplifier circuit 16. Therefore, the gain of the amplifier circuit 16 is inversely related to the amplitude of the feedback signals. However, the amplitude of the feedback signals is inversely related to the impedance of the variable capacitor 40 in the feedback circuit 18. Thus, the gain of the amplifier circuit 16 is directly related to the impedance of the variable capacitor 40. In addition, the impedance of the variable capacitor 40 is inversely related to the frequency of the feedback signals and the capacitance of the capacitor 40. Accordingly, the gain of the amplifier circuit 16 is likewise inversely related to the frequency of the feedback signals and the capacitance of the variable capacitor 40. Hence, as the frequency of the feedback signals or the capacitance of the variable capacitor 40 is increased, the impedance of the variable capacitor 40 decreases so that the amplitude of the feedback signals increases thereby decreasing the gain of the amplifier circuit 16.

Figure 2:
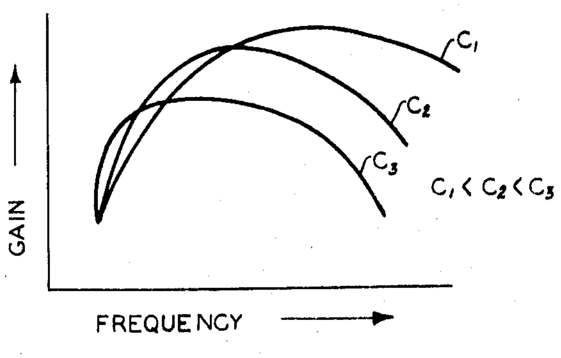
FIG. 2 is a graph illustrating a set of typical frequency response curves obtainable from the preferred embodiment of the invention.

The above relationships can be best understood by reference to FIG. 2 which discloses a typical set of gain versus frequency curves for the amplifier circuit 16 at different values of capacitance for the variable capacitor 40. It will be observed that at the higher frequencies within the audio range, as represented by the latter portions of the curves, the gain decreases as the frequency increases. Similarly, as the capacitance C of the variable capacitor 40 increases the gain decreases more sharply at the higher frequencies within the audio range. Thus, varying the capacitance of the variable capacitor 40 varies the relative amplification of the higher audiofrequencies with respect to the amplification lower audiofrequencies so as to establish an effective tone control.

Figure 3:
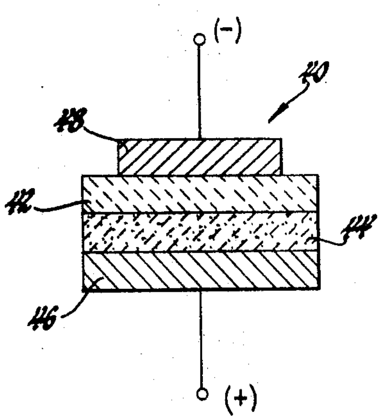
FIG. 3 is a cross-sectional view of a typical voltage variable capacitor which may be employed in conjunction with the preferred embodiment of the invention.

In the illustrated tone control apparatus, the variable capacitor 40 is a voltage variable capacitor or varactor. The voltage variable capacitor 40 may be either a junction varactor such as a reverse biased semiconductor diode, or a surface varactor such as a metal-insulator-semiconductor (MIS) structure. Preferably, the voltage variable capacitor 40 is a surface varactor having a MIS structure as disclosed in FIG. 3. The illustrated MIS structure comprises an insulator layer 42 and a semiconductor layer 44 sandwiched between two metal electrodes or plates 46 and 48. In the preferred embodiment, the insulator layer 42 is tantalum oxide and the semiconductor layer 44 is an N-type silicon. However, it is to be understood that the insulator layer 42 may be any suitable metal oxide, and the semiconductor layer 44 may be any suitable semiconductor material. The plates 46 and 48 may be made of any suitable electrically conducting metal.

A positive voltage or potential applied from the plate 46 to the plate 48, develops an electric field normal to the interface between the insulator layer 42 and the semiconductor layer 44. The electric field establishes a space charge depletion region in the semiconductor layer near the interface between the insulator layer 42 and the semiconductor layer 44. As the applied voltage is increased, the electric field increases thereby to increase the space charge depletion region in the semiconductor layer 44. The space charge depletion region effectively increases the distance between the plate 46 and the plate 48 so as to decrease the capacitance between the plates 46 and 48. Thus, the capacitance between the plates 46 and 48 is an inverse function of the voltage applied across the plates 46 and 48. A more detailed explanation of the operation of a surface varactor having an MIS structure can be obtained by consulting either of the following references: W. G. Pfann, C. G. B. Garret, *Proceedings of the IRE*, Vol. 47, No. 11, p. 2011, Nov., 1959; and R. Lindner, "Semiconductor Surface Varactor," *The Bell System Technical Journal*, Vol. 41, No. 3, pp. 803–831, May, 1962.

It will now be appreciated that, providing the voltage variable capacitor 28 is properly poled in the feedback circuit 18, the capacitance of the voltage variable capacitor 40 is inversely related to the DC control voltage applied to the junction between the voltage variable capacitor 40 and the fixed capacitor 38 by the control circuit 20. The fixed capacitor 26 prevents the applied control voltage from leaking through the amplifier circuit 16 or the audio amplifier section 14 to ground.

The control circuit 20 comprises a variable potentiometer 50 including a reference resistor 52 connected to the voltage source 24, and a movable wiper arm 54 mechanically connected to a manually operable control element 56 and electrically connected to the junction between the fixed capacitor 38 and the voltage variable capacitor 40 through an isolating impedance 58 and a single unshielded conductor 60. The voltage source 24 applies a reference voltage across the resistor 52. The control element 56 is manually operable so as to selectively adjust the wiper arm 54 with respect to the resistor 52 so as to pick off a desired portion of the reference voltage to be utilized as a control voltage. The control voltage is applied to the voltage variable capacitor 40 through the impedance 54 and the conductor 60 so as to determine the capacitance of the voltage variable capacitor 40. The isolating impedance 58 prevents the audiofrequency feedback signals in the feedback circuit 18 from leaking through the control circuit 20 to ground. Preferably, the isolating impedance is a resistor, but it may also be an inductor. It is to be noted that the illustrated control circuit 20 is shown for demonstration purposes only, and that many other variable voltage control circuits could also be employed.

In operation, the control element 56 is manually manipulated so as to vary the control voltage applied across the voltage variable capacitor 40. As the control voltage is varied, the capacitance of the voltage variable capacitor 40 is varied inversely so that the gain of the amplifier circuit 16 is varied directly. Hence, the frequency response or gain versus frequency characteristic of the amplifier circuit 16 is an inverse function of the control voltage applied across the voltage variable capacitor 40 at the higher audio frequencies. Therefore, effective tone control can be achieved by manually adjusting the control element 56 thereby regulating the high-frequency response of the amplifier circuit 16.

In a tone control apparatus constructed in accordance with the preferred embodiment of the invention illustrated in FIG. 1, the following components and values were found to yield satisfactory results.

| | |
|---|---|
| Transistor 22 | Delco Radio DS–66 |
| Voltage Source 24 | 12 volts |
| Resistor 26 | 600 ohms |
| Resistor 30 | 2800 ohms |
| Resistor 32 | 15000 ohms |
| Resistor 36 | 3300 ohms |
| Resistor 52 | 100,000 ohms |
| Impedance 58 | 1,000,000 ohms |
| Capacitor 28 | 100 microfarads |
| Capacitor 34 | 10 microfarads |
| Capacitor 38 | 10 micormicrofarads |
| Capacitor 40 | 1.0 micromicrofarad |
| | 0 0 volts |
| | 0.1 micromicrofarad |
| | 0 12 volts |

It will now be observed that the voltage variable capacitor 40 exhibits certain desirable characteristics which are necessary to insure satisfactory operation of the illustrated tone control circuit 10 across the standard AM broadcast frequency band when incorporated within an automotive radio receiver. Thus, the capacitor 40 provides a ratio of maximum capacitance to minimum capacitance of approximately 10:1 in a range extending from 1.0 micromicrofarads to 0,1 micromicrofarads in response to variation of the control voltage from 0 volts to 12 volts. Further, the capacitor 40 provides a relatively large capacitance of 1.0 micromicrofarads when the control voltage is at 0 volts. It has been found that these desirable characteristics are directly attributable to the particular metal-insulator-semiconductor structure of the voltage variable capacitor 40 which includes an insulator layer of tantalum oxide and a semiconductor layer of N-type silicon sandwiched between a pair of metal electrodes.

It will now be readily appreciated that the control circuit 20 of the tone control apparatus 10 can be located remote from the rest of the radio receiver. Thus, the tone control apparatus of the invention is particularly adaptable to radio receiver applications where it is necessary that the radio receiver controls be located remote from the rest of the radio receiver. As previously discussed, one such application is in an automotive vehicle where it is desirable to conserve the space normally occupied by the radio receiver behind the instrument panel. In such instance, the radio receiver controls can be mounted on the instrument panel and the radio receiver can be located remote from the radio receiver controls in some heretofore unused space, such as under the rear seat or in the trunk. However, while it is apparent that the tone control apparatus of the invention is especially advantageous as applied to an automotive vehicle, it is to be understood that the invention is not limited to automotive vehicle applications and it is equally adaptable to a wide variety of other applications.

It is to be understood that various modifications and alterations may be made to the preferred embodiment disclosed herein without departing from the spirit and scope of the invention which is to be limited only by the following claims.

What is claimed is:

1. In a radio receiver having a detector circuit and an output amplifier circuit, and adapted for installation within an automotive vehicle having a voltage source which provides a direct current voltage at a nominal 12 volts; a tone control apparatus comprising: an audio amplifier circuit including a transistor having an input electrode and an output electrode, and biasing means connected to the transistor for setting the operating point of the transistor such that audio signals received from the detector circuit by the input electrode are amplified and applied by the output electrode to the output amplifier circuit; a degenerative feedback network connected between the output electrode and the input electrode of the transistor to define the gain of the transistor as an inverse function of the amplitude of feedback signals fed from the output electrode back to the input electrode of the transistor, the degenerative feedback network including impedance means for defining the amplitude of the feedback signal as an inverse function of the impedance of the impedance means, the impedance means including voltage variable capacitance means for defining the impedance of the impedance means as an inverse function of the capacitance of the voltage variable capacitance means and the frequency of the feedback signal, the voltage variable capacitance means providing a capacitance which is an inverse function of a control voltage applied to the voltage variable capacitance means, the voltage variable capacitance means having a metal-insulator-semiconductor structure including an insulator layer of tantalum oxide and a semiconductor layer of N-type silicon sandwiched between a pair of metal electrodes thereby to provide a ratio of maximum capacitance to minimum capacitance of at least approximately 10:1 as the control voltage is varied between 0 volts and 12 volts; and a control circuit including adjustable potentiometer means connected across the voltage source for developing the control voltage which is variable between 0 volts and 12 volts, the adjustable potentiometer means located remote from the radio receiver and connected to the voltage variable capacitance means via a single unshielded conductor over which the control voltage is applied to the voltage variable capacitance means thereby to regulate the gain versus frequency characteristic of the transistor amplifier so as to exercise tone control over the audio output of the radio receiver.